(12) United States Patent
Kaiser

(10) Patent No.: US 6,494,101 B2
(45) Date of Patent: *Dec. 17, 2002

(54) MEASURING DEVICE FOR BRAKE SYSTEM OF MOTOR VEHICLE

(75) Inventor: Harry Kaiser, Markgroeningen (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/380,409

(22) PCT Filed: Feb. 12, 1998

(86) PCT No.: PCT/DE98/00391

§ 371 (c)(1),
(2), (4) Date: Aug. 31, 1999

(87) PCT Pub. No.: WO98/41831

PCT Pub. Date: Sep. 24, 1998

(65) Prior Publication Data

US 2002/0100332 A1 Aug. 1, 2002

(30) Foreign Application Priority Data

Mar. 19, 1997 (DE) ......................................... 197 11 366

(51) Int. Cl.$^7$ ................................................. G01L 7/00
(52) U.S. Cl. ........................................................ 73/756
(58) Field of Search ........................... 73/756, 715, 727, 73/721; 307/3, 15, 118.1; 188/72.1, 370, 164, 155–158, 41

(56) References Cited

U.S. PATENT DOCUMENTS

| | | | | |
|---|---|---|---|---|
| 4,567,395 A | * | 1/1986 | Pundarika | 310/338 |
| 4,984,468 A | * | 1/1991 | Hafner | 73/727 |
| 5,325,720 A | * | 7/1994 | Zuckerwar et al. | 73/756 |
| 5,443,306 A | * | 8/1995 | Broome | 303/3 |
| 5,839,637 A | * | 11/1998 | Kanai | 226/128 |
| 5,939,637 A | * | 8/1999 | Pitzer et al. | 73/715 |

* cited by examiner

Primary Examiner—Max Noori
(74) Attorney, Agent, or Firm—Michael J. Striker

(57) ABSTRACT

A measuring device is proposed whose sensors (12) and circuit holders (14) are combined into a compactly structured measuring device (10). This measuring device (10) has a console (11), which is used for containing circuit holders (14) and sensors (12). The measuring device (10), which can be fastened anywhere and is therefore easily accessible, permits a relatively short, direct line routing and consequently, to the greatest extent possible, prevents the accumulation of function-impairing air cushions in the measuring circuits, particularly in pressure measurements. specially embodied bushings (35) that are connected in an airtight fashion to the measuring cells (30) of the pressure sensors (12) reduce the interior space of the cup-shaped pressure sensors (12) so that air cushions are also to a large extent prevented in these components.

17 Claims, 2 Drawing Sheets

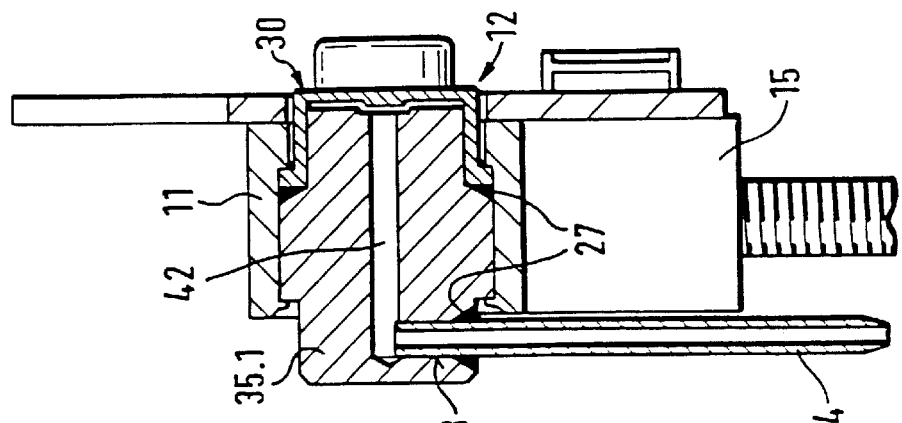
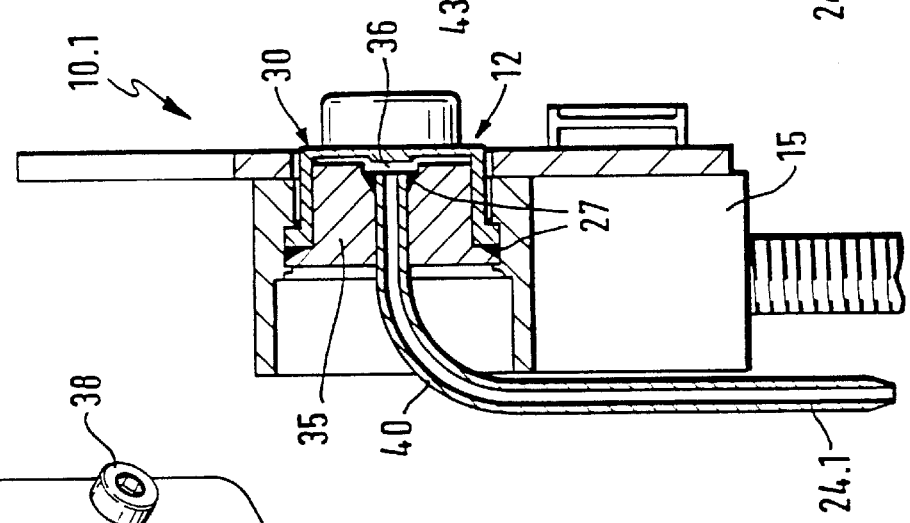
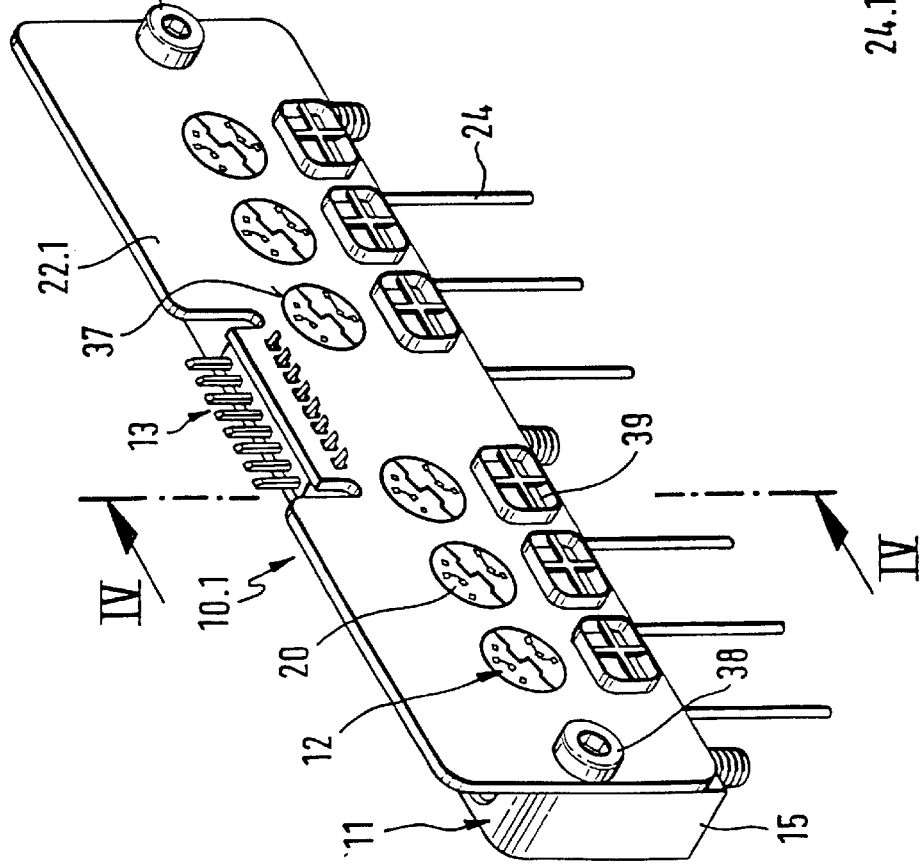

MEASURING DEVICE FOR BRAKE SYSTEM OF MOTOR VEHICLE

BACKGROUND OF THE INVENTION

The invention is based on a measuring device. Measuring devices are used for example in brake systems of motor vehicles, which are electrohydraulically actuated or regulated. Known applications are antilock brake systems or brake systems without mechanical coupling between the brake actuation pedal and the master cylinder.

The main parameters for regulating these electrohydraulic brake systems are the operating pressures that occur in the brake circuits. These can be detected by brake sensors, converted into electrical signals, and, together with other sensors signals, can be processed in a control unit into control signals for the brake assembly. This requires a relatively large number of individual parts, which must be separately fastened and connected by way of hydraulic or electric lines. When routing hydraulic lines, in particular a possible production of air cushions in the measuring circuits must be prevented because air conditions of this kind can cause incorrect measurements and in the extreme case, can lead to malfunctions of the brake system. A production of air cushions is particularly encouraged when conventional, inexpensive pressure sensors with cup-shaped measuring cells are used.

SUMMARY OF THE INVENTION

In keeping with these objects, one feature of present invention resides, briefly stated in a measuring device, in which at least one sensor and at least one circuit holder are combined into a measuring unit with the aid of a console.

A measuring device with these characterizing features has the advantage over the prior art of a measuring device that is combined into a separate assembly, which in particular can be fastened to the hydraulic block of a brake assembly and as a result, has a relatively compact structure. The necessary electric and hydraulic line routing from or to the measuring device can therefore take place in a comparatively short and direct manner so that to a large extent, hollow chambers that are not flowed through in the measuring circuits can be prevented. Also, the hollow chambers required by the cup-shaped embodiment of the pressure sensors are reduced to an obligatory minimum in the measuring device according to the invention. The measuring device has a particularly embodied console with recesses for the sensors and the circuit holders. As a result, the console also protects these sensitive components against mechanical and thermal stresses. The measuring device is also easily accessible when serviced and can be replaced with a small number of operations and using a standard tool.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

Exemplary embodiments of the invention are shown in the drawings and will be explained in more detail in the subsequent description.

FIG. 3 shows a perspective view of a second exemplary embodiment;

FIGS. 4 and 5 show cross sections along the line IV—IV in FIG. 3, which disclose different possibilities for routing the measuring tube to the sensors.

DESCRIPTION OF THE PREFERRED EMBODIMENTS

Figure 1:
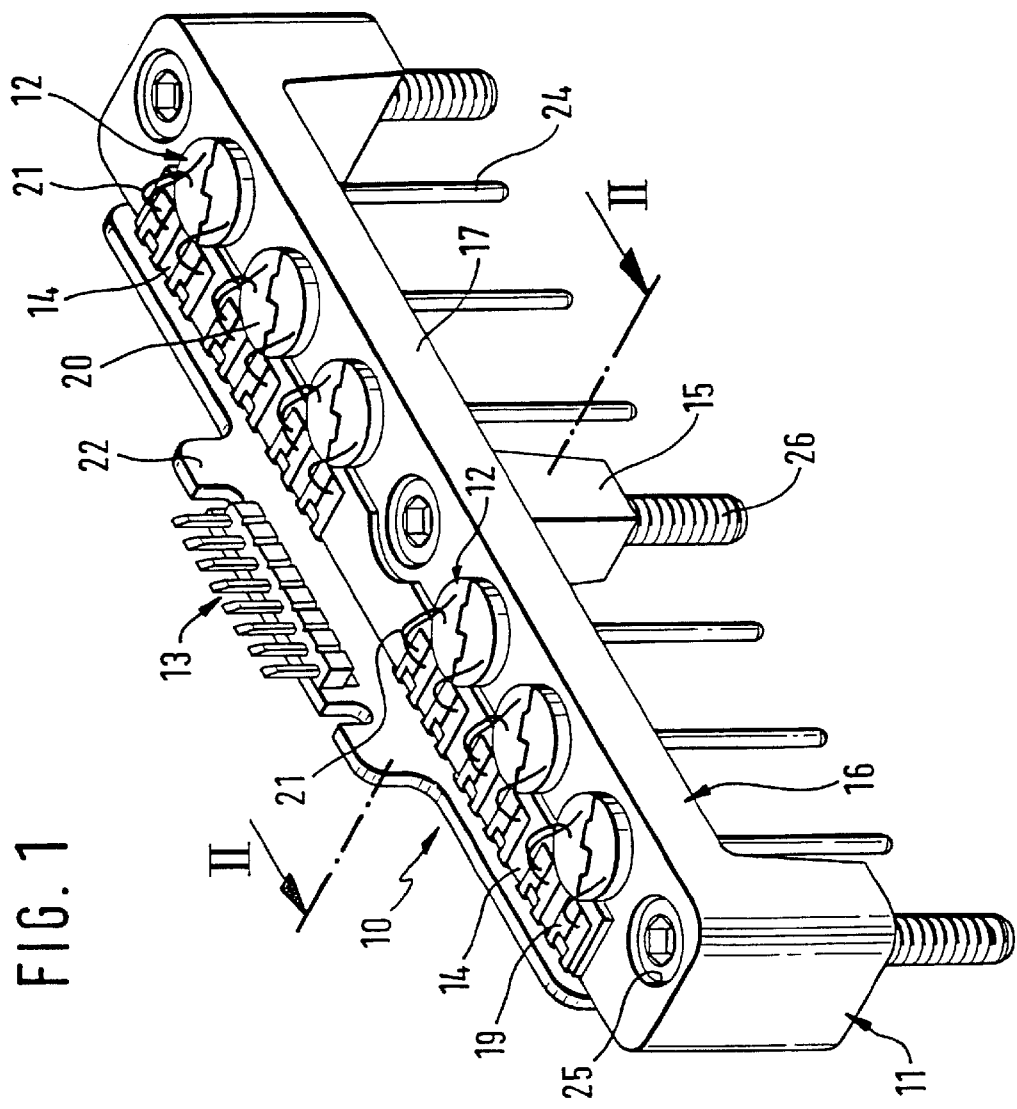
FIG. 1 is a perspective view that shows a first exemplary embodiment of a measuring device.

FIG. 1 shows a measuring device 10, which is essentially comprised of a console 11, for example six pressure sensors 12 disposed on the console 11, and a circuit holder 14 associated with each of the pressure sensors 12. The console 11 is embodied in the form of a bridge and in the exemplary embodiment has a total of three supports 15, which are connected to each other by means of a lateral cross bars 16. The supports 15 divide the cross bars 16 into two cross bar sections 17. In the vicinity of one cross bar sections 17, for example, three recesses 18 are provided (FIG. 2) into which the pressure sensors 12 are inserted. The pressure sensors 12 in this connection are disposed parallel to the longitudinal direction of the supports 15. On their ends protruding from the cross bar 16, the pressure sensors 12 respectively have a resistance bridge circuit 20 that is for measurement value detection and is connected by means of contact lines 21 to the circuit holders 14, which are positioned on the console 11 lateral to the pressure sensors 12 and process the measurement values. The strip conductors 19 of the circuit holders 14 continue on a printed circuit board 22 which is fastened at right angles to the circuit holders 14 on the console 11. This printed circuit board 22 has a plug device 13 in order to convey the measurement results to external control electronics, not shown. In order to measure pressures at different measurement points of a brake system, the pressure sensors 12 are coupled by means of measuring tubes 24 to the corresponding pressure measurement points. The measuring tubes 24, only sections of which can be seen in FIG. 1, are accordingly filled with pressure medium, which is at the pressure level to be detected, and feed into the pressure sensors 12 opposite from their ends protruding from the cross bar 16 (FIG. 2).

FIG. 1 also shows that the console 11 has through bores 25 in the vicinity of its supports 15. These through bores 25 contain fastening elements 26—screws in the exemplary embodiment—via which the measuring device 10 can be fastened preferably to an electrohydraulically controllable hydraulic block, not shown, of a brake assembly.

Figure 2:
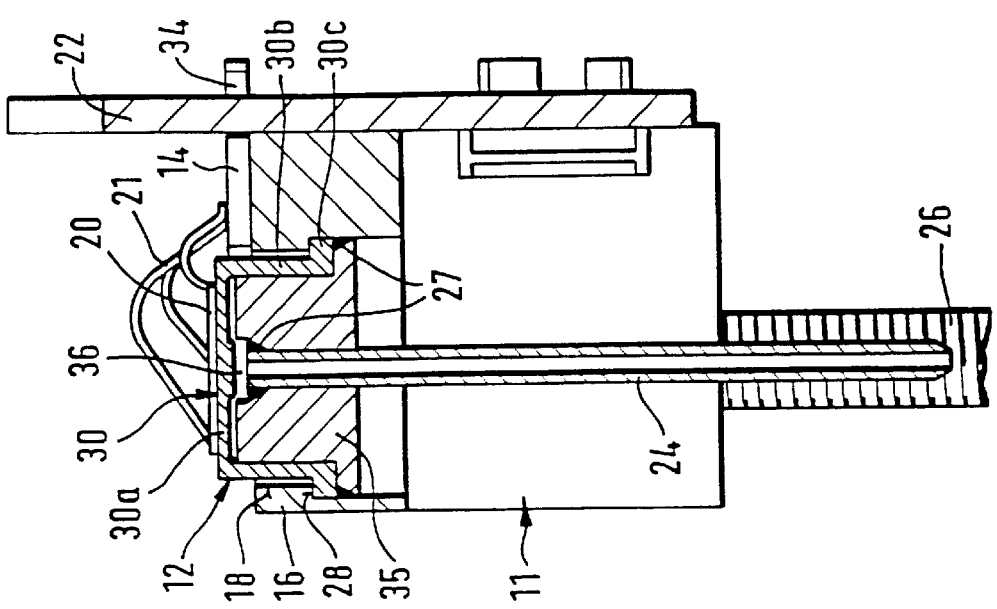
FIG. 2 shows the measuring device according to FIG. 1 in a cross section along the cutting line II—II in FIG. 1.

It is clear from the cross section of the measuring device 10 depicted in FIG. 2 that the continuous recesses 18 of the cross bar 16 are offset once in their inner diameter. The smaller inner diameter is disposed on the side of the console 11 remote from the supports 15 (FIG. 1). The transition from the smaller inner diameter to the larger one is embodied at right angles so that a circumferential contact shoulder 28 is formed. A pressure sensor 12, which is available as a mass-produced item, rests against the contact shoulder 28 and is comprised of a measuring cell 30 and a resistance bridge circuit 20 that is affixed to this cell. The measuring cell 30 of the pressure sensor 12 is embodied as hat-shaped for safety reasons among other things and is correspondingly comprised of a cover plate 30a, a wall 30b, and a collar 30c which cooperates with the contact shoulder 28 of the recess 18. The resistance bridge circuit 20 is fastened to the outside of the cover plate 30c of the measuring cell 30 protruding from the recess 18 and, by means of contact lines 21, is electrically coupled to a circuit holder 14, which is laterally affixed to the console 11 and processes the measurement results. The circuit holders 14 have contact pins 34, which are embodied on their circumference side oriented toward the printed circuit board 22, protrude through plug bores, not shown, in the printed circuit board 22 fastened at right angles to the circuit holders 14 on the console 11, and are conductively connected to this printed circuit board 22.

FIG. 2 also shows that the inside region of the measuring cell 30 is filled up by a bushing 35 except for a narrow measuring gap 36 extending parallel to the cover plate 30a. The bushing 35 has a likewise hat-shaped outer contour, is dimensionally matched to the inner diameter of the measuring cell 30, and has a straight measuring tube 24 passing through it along its longitudinal axis. The first end of this measuring tube 24 feeds into the measuring gap 36 while the second end, not shown, disposed opposite this ends at a pressure measurement point of a hydraulic circuit. Among other things, the bushing 35 has the function of sealing the measuring gap 36 in relation to the outside. To this end, the bushing 35 has an airtight connection 27 with the measuring cell 30 and also with the measuring tube 24. This connection 27 can be embodied for example as a solder or a weld, in particular as a laser weld. This ensures that the pressure level in the measuring gap 26 is identical to that of the pressure measurement point and can be reliably measured. Because the size of the measuring gap 36 has been reduced by the bushing 35 to an obligatory minimum, there is the additional assurance that larger portions of residual air possibly present in the hydraulic circuits to be measured or in the measuring tubes 24, which could distort the pressure measurement, cannot collect in the measuring gap 36.

FIG. 3 shows a measuring device 10.1 as a second exemplary embodiment, which is essentially comprised of the same component parts as the measuring device 10 described above. Identical components are therefore provided below with the same reference numerals while structurally altered components are indicated by having the index 1 added to their reference numerals. In contrast to the measuring device 10, the measuring device 10.1 has pressure sensors 12 which are disposed at right angles to the longitudinal direction of the supports 15 (FIG. 1). The pressure sensors 12 thereby protrude with their ends which have the resistance bridge circuit 20 through corresponding bores 37 in a printed circuit board 22.1. The printed circuit board 22.1 is fastened to the console 11.1 with the aid of screw connections 38. Advantageously, the pressure sensors 12 can thus contact the printed circuit board 22.1 directly. In addition to the plug device 13, the evaluation circuits for the resistance bridge circuits 20 in the form of integrated circuits 39 are also placed on the printed circuit board 22.1. The measuring device 10.1 is therefore distinguished by a considerably smaller number of individual parts since the circuit holders 14 which were required in the first exemplary embodiment and their contact lines 21 can thus be eliminated without being replaced. As a result, the assembly expense for the measuring device 10.1 is reduced along with a simultaneous increase in its reliability. The embodiment of the measuring tube 24 is also slightly different in the measuring device 10.1. FIGS. 4 and 5 show two embodiments for this that can be produced in a comparatively inexpensive manner.

According to FIG. 4, a bushing 35 that is embodied identically to the one in the first exemplary embodiment is inserted into the measuring cell 30 of the pressure sensor 12 disposed at right angles to the supports 15 and is affixed by way of an airtight connection 27. Due to the altered position of the pressure sensor 12, the measuring tube 24.1, which is at first routed parallel to the supports 15, has a bend 40 before it feeds into the bushing 35. If such a band 40 of the measuring tube 24.1 were to be undesirable for certain applications for stability or cost reasons, an embodiment that has been improved in this regard is shown in FIG. 5.

According to FIG. 5, instead of adapting the measuring tube 24.1 to the altered position of the pressure sensor 12, the proposal is made to adapt the bushing 35.1 that is inserted into the measuring cell 30. To this end, the bushing 35.1 is lengthened until its end remote from the measuring cell 30 of the pressure sensor 12 protrudes past the console 11. A blind bore 42 is embodied in the bushing 35.1 and extends from its opening, which feeds into the measuring gap 26, into the vicinity of the end of the bushing 35.1 that protrudes beyond the console 11. A radial bore 43 is disposed in the protruding region of the bushing 35.1 and continues the blind bore 42 toward the outside. The measuring tube 24 is fixed in this radial bore 43 by way of the airtight connection 27. This measuring tube 24 can consequently still be routed parallel to the supports 15 and thereby be embodied as straight despite a position of the pressure sensors 12 which is offset at right angles to that of the supports 15.

Naturally it is possible for there to be changes or additions to the above-described exemplary embodiment of a measuring device 10 without departing from the fundamental concept of the invention. For example, it is therefore conceivable to also use a measuring device 10 of this kind for measurement tasks outside the automotive field. These applications are also not limited to pressure measurements since the pressure sensors 12 can also be replaced by arbitrary other sensors.

What is claimed is:

1. A pressure sensor, comprising a substantially cup-shaped measuring cell 30 having a wall 30b which laterally defines an inner chamber, a cover plate 30a supported by said wall, and a measuring gap 36 provided inside said measuring cell so that a hydraulic fluid flows through said measuring gap; a measuring value detection circuit 20 arranged on said cover plate; and a bushing 35 inserted in said inner chamber of said measuring cell and completely filling up a volume of said inner chamber with an exception of said measuring gap, said measuring gap being narrow, extending parallel to said cover plate, and being reduced by said bushing to a minimum, said measuring cell 30 having an inner contour substantially corresponding to an outer contour of said bushing 35.

2. A pressure sensor as defined in claim 1, wherein said bushing has a fluid-tight connection with said measuring cell.

3. A pressure sensor as defined in claim 1; and further comprising a measuring tube fitting into said bushing and connecting said measuring gap to an associated measuring point, said measuring tube having an airtight connection with said bushing.

4. A pressure sensor as defined in claim 2, wherein said airtight connection between said bushing and said measuring cell is a welded connection.

5. A pressure sensor as defined in claim 4, wherein said welded connection is a laser-welded connection.

6. A pressure sensor as defined in claim 3, wherein said air tight connection between said measuring tube and said bushing is a welded connection.

7. A pressure sensor as defined in claim 6, wherein said welded connection is a laser-welded connection.

8. A pressure sensor as defined in claim 2, wherein said airtight connection between said bushing and said measuring cell is a soldered connection.

9. A pressure sensor as defined in claim 3, wherein said airtight connection between said measuring tube and said bushing is a soldered connection.

10. A pressure sensor as defined in claim 3, wherein said measuring cell is located in a direction of a longitudinal axis of said measuring tube.

11. A pressure sensor as defined in claim 3, wherein said measuring, cell is disposed offset from a longitudinal axis of said measuring tube at a right angle.

12. A pressure sensor as defined in claim 1; and further comprising at least one circuit holder and a console formed so that said measuring cell and said circuit holder are combined into a measuring device by said console.

13. A pressure sensor as defined in claim 12, wherein said console is formed as a bridge and has at least two supports, said at least one circuit holder being fastened to one of longitudinal sides of said console.

14. A pressure sensor as defined in claim 13; and further comprising a measuring tube connecting said measuring gap to an associated measurement point, said measuring tube extending at least sectionally parallel to a longitudinal direction of said support.

15. A hydraulic block for controlling an electrohydraulic brake assembly, comprising a pressure sensor including a substantially cup-shaped measuring cell having a wall which laterally defines an inner chamber a cover plate supported by said wall, and a measuring gap provided inside said measuring cell so that a hydraulic fluid flows through said measuring gap, a measuring value detection circuit arranged on said cover plate, and a bushing inserted in said inner chamber of said measuring cell and completely filling up a volume of said inner chamber with an exception of said measuring gap, said measuring gap being narrow, extending parallel to said cover plate, and being reduced by said bushing to a minimum, said measuring cell having an inner contour substantially corresponding to an outer contour of said bushing.

16. A pressure sensor as defined in claim 1, wherein said outer contour of said bushing is dimensionally matched to an inner diameter of said measuring cell.

17. A hydraulic lock as defined in claim 15, wherein said outer contour of said bushing is dimensionally matched to an inner diameter of said measuring cell.

* * * * *